United States Patent [19]

Kameyama et al.

[11] Patent Number: 4,953,048
[45] Date of Patent: Aug. 28, 1990

[54] MAGNETIC HEAD WITH SPECIFIC GAP STRUCTURE

[75] Inventors: Makoto Kameyama, Urayasu; Kiyozumi Niizuma, Ohmiya; Kenichi Nagasawa, Kawasaki; Takashi Suzuki, Yokohama; Toshio Yamanaka, Kawasaki; Tsuyoshi Orikasa, Kasukabe; Fujihiro Ito, Tsurugashima; Kazuyo Yoshida, Kawasaki, all of Japan

[73] Assignee: Canon Kabushiki Kaisha, Tokyo, Japan

[21] Appl. No.: 353,234

[22] Filed: May 17, 1989

Related U.S. Application Data

[63] Continuation of Ser. No. 917,152, Oct. 9, 1986, abandoned.

[30] Foreign Application Priority Data

| Oct. 9, 1985 [JP] | Japan | 60-226568 |
| Dec. 3, 1985 [JP] | Japan | 59-272824 |
| Sep. 13, 1986 [JP] | Japan | 61-216150 |

[51] Int. Cl.$^5$ .......................................... G11B 5/187
[52] U.S. Cl. ........................................ 360/119; 360/122
[58] Field of Search .............................. 360/119-120, 360/122, 126

[56] References Cited

U.S. PATENT DOCUMENTS

| 4,656,547 | 4/1987 | Kumasaka | 360/122 X |
| 4,682,256 | 7/1987 | Ayabe | 360/119 |

FOREIGN PATENT DOCUMENTS

| 3447700 | 7/1985 | Fed. Rep. of Germany |
| 32107 | 2/1985 | Japan |

Primary Examiner—A.J. Heinz
Attorney, Agent, or Firm—Fitzpatrick, Cella, Harper & Scinto

[57] ABSTRACT

A magnetic head including pair of core halves joined opposite to each other, each core half including a first magnetic material on which is deposited a magnetic film of a second magnetic material having a high saturation magnetic flux density and a low magnetic permeability compared with the first magnetic material, both the magnetic films having a magnetic gap arranged therebeteween, includes a pair of nonmagnetic members, each of which is adjacent to each end of the magnetic gap, in a surface of the head, along which a recording medium slides, wherein each of the magnetic films extends along the outer edge of the nonmagnetic member adjacent to one of the core halves, and the boundary between the first magnetic material and the second magnetic material includes a portion extending outward and a portion extending parallel to the magnetic gap and out of alignment with the first-mentioned portion.

20 Claims, 23 Drawing Sheets

MAGNETIC HEAD WITH SPECIFIC GAP STRUCTURE

This application is a continuation of application Ser. No 917,152 filed on Oct. 9, 1986, now abandoned.

BACKGROUND OF THE INVENTION

1. Field of the Invention

The present invention relates to magnetic heads, and more particularly to a magnetic head comprising a pair of core halves, each including a magnetic block of a first magnetic material, and a magnetic film of a second magnetic material deposited on the first magnetic material, the second magnetic material having a high saturation magnetic flux density and a low magnetic permeability compared with the first magnetic material, the pair of core halves being disposed opposite to each other so that both the magnetic films have a magnetic gap arranged therebetween.

2. Related Background Art

Conventionally, in order to perform good recording on a magnetic recording medium having a high coercive force and good reproduction from the medium, a magnetic head, a so-called MIG (Metal In Gap) head has been proposed which includes a pair of core halves, each including a high-magnetic permeability oxide magnetic member and a magnetic metal film having a high saturation magnetic flux density deposited on the oxide magnetic body.

Known among magnetic heads of this type is a magnetic head, in which, in a surface of the head, along which a medium can slide (hereinafter referred to as the medium-sliding surface), the boundary between the magnetic metal film and the oxide magnetic material is parallel to the gap. This boundary, however, acts as a dummy gap, thereby deteriorating the characteristic of the head.

On the other hand, a magnetic head having a core structure shown in FIG. 1 is proposed, for example, by Published Unexamined Japanese Patent Application No. 32107/1985. In FIG. 1, reference numerals 1a, 1b denote an oxide magnetic member, for example, of ferrite. Reference numerals 2a, 2b denote magnetic metal films of sendust, an amorphous material, permalloy or the like on the oxide magnetic material using a film forming method, such as sputtering, evaporation or the like. Reference numerals 3a, 3b, 3c, 3d denote nonmagnetic materials of glass or the like. Reference numeral 4 denotes a winding window. Reference numeral 5 denotes a magnetic gap.

In the magnetic head of FIG. 1, the boundary between the oxide magnetic member 1a or 1b and the magnetic metal film 2a or 2b is not parallel to the magnetic gap, and so the boundary does not act as a dummy gap. Both the track-widthwise ends of the gap are supported by high wear-resisting ferrite members. Thus, the matching of this magnetic head with a recording medium, the running characteristic of the head, etc., are improved.

However, manufacture of the magnetic head shown in FIG. 1 includes a step requiring high-accuracy working. FIGS. 2A-2I illustrate one example of the steps of manufacturing the head shown FIG. 1, and show part of a surface of the head which will be the medium-sliding surface after manufacturing.

First, as shown in FIG. 2A, many V-like grooves 11 are formed on a ferrite blocked 10 at predetermined pitches. Formation of these V-like grooves is performed using a plurality of equispaced grinding stones. Working these grooves 11 requires a very high accuracy. The reason for this will be described hereinafter. Assuming that variations of about 10 $\mu$m are produced in the desired groove depth as shown by 11a in FIG. 2A, these errors in groove depth (shown by x) will be errors (shown by y) in the edges of the grooves. For example, if the angle between a groove side and the surface in which the groove are formed is 45°, x=y and y=10 $\mu$m.

Under the situation shown in FIG. 2A, a magnetic metal film 12 of sendust, or the like, is formed on the surface of ferrite block 10 in which V-grooves 11 are formed (FIG. 2B). Then, the magnetic metal film is ground and removed using surface grinding or the like until ferrite block portions are exposed. The V-like grooves with the magnetic metal films being formed thereon are then filled with a nonmagnetic material 13 such as glass of a high melting point (FIGS. 2C and 2D).

Similarly, new V-like grooves 14 are formed, each being between adjacent V-like grooves 11 (FIG. 2E). These grooves 14 are filled with a nonmagnetic material 15, then the resulting surface of this product is ground using surface grinding and a core half block 16 as shown in FIG. 2F is obtained. A pair of such core halves 16 are prepared, one of which is worked so as to have a winding groove. These core halves are joined opposite to each other so that the magnetic metal films 12 face each other with a magnetic gap material therebetween (FIG. 2G). Then, these joined blocks are cut along dot-dashed lines 17 to obtain a magnetic head core chip with the medium-sliding surface as shown in FIG. 2H.

If errors are produced in the depth of the grooves 11, however, a magnetic head core chip as shown FIG. 2I may be produced. Thus, in order to control the track width of a head accurately, a working technique of a very high accuracy is required.

While the above example has been described with reference to the influence of errors produced in the depth of grooves 11 on which the magnetic metal films 12 are formed, of course, errors may be produced in the depth of V-like grooves 14 in which no magnetic metal films are formed. FIGS. 3A-3J illustrate another example of the steps of manufacturing the head of FIG. 1 in order to explain the effect of errors in the depth of V-like grooves 14. Like reference numerals in FIGS. 3A-3J and 2A-2I denote like components.

First, as shown in FIG. 3A, V-like grooves 14 are formed on the ferrite block. Reference numeral 14a denotes a V-like groove having an error in depth. These grooves 14 are filled with a nonmagnetic material 15 such as high-melting point glass (FIG. 3B). V-like grooves 11 are then formed, each being between adjacent V-like grooves 14, coated with a magnetic metal film 12, and subjected to surface grinding (FIGS. 3C, 3D, 3E). The V-like grooves 11 covered with the magnetic metal film are also filled with melted high melting point glass to obtain a core half block as shown in FIG. 3F. A pair of such core halves are joined opposite to each other and cut along dotted lines 17 in FIG. 3G.

Thus, a head core chip as shown in FIG. 3H is obtained. If errors are produced in the depth of the V-like grooves 14, head core chips such as that shown in FIG. 3I or 3J will be manufactured. In the head having the core structure shown in FIG. 3I, magnetic fluxes are collected near the gap 5 in the magnetic metal film 2b, the magnetic reluctance is increased and the electromagnetic conversion characteristic is deteriorated. In the head having the core structure of FIG. 3J, leakage fluxes produced between the end (shown by x) of the ferrite portion 1b situated on the track and the magnetic gap 5 or the other ferrite portion 1a would deteriorate the magnetic recording reproducing characteristic.

As described above, a very high accuracy is required for manufacturing a prior art magnetic head as shown in FIG. 1.

The head of FIG. 1 includes the pair of core halves each made of ferrite, sendust and glass which are different in coefficient of linear expansion. The steps of heating the pair of assembled core halves up to 600° C. and cooling the resulting product down to the normal temperature are performed in joining the pair of assembled core halves by fusing the glass included between the core halves. Thus, if the sendust film is thick, strain due to internal stress would be accumulated in the joined and/or boundary surfaces. When this internal stress is released, however, cracks may occur in the ferrite or glass which may be separated in an extreme case. Thus, the manufacturing process must be stabilized greatly in terms of yield.

It cannot be said that the head having the structure of FIG. 1 is suitable for use in wide track recording systems, for example, having a track width as wide as 60 $\mu$m. The reason for this is as follows. If the thickness of the sendust film 2 is T, the length of the operating gap is 2T, because the film 2 is inclined at 45° to the gap. Thus, in order to obtain a head having a desired track width of 60 $\mu$m and an azimuth angle of 0 degrees, the film thickness T would be as thick as $=60$ $\mu$m/2$\approx$42 $\mu$m. If it is desired to obtain such a film thickness, the film forming time would increase. In addition, the ferrite member which will be a base may be cracked due to the internal stress in the film itself, or, even if such a film is formed without trouble, the problems with the fusing steps, as described above in detail, would be further severe and the yield of intermediate products up to the head chip would be extremely low.

SUMMARY OF THE INVENTION

It is an object of the present invention to provide a magnetic head which is capable of solving the above problems.

It is another object of the present invention to provide a magnetic head which is capable of preventing a reduction of yield of manufacture due to accumulation of internal stress.

It is still another object of the present invention to provide a magnetic head which has a wide track without increased film thickness.

Under these objects, according to the present invention, there is provided, as an embodiment, a magnetic head comprising:

(a) a pair of magnetic blocks, each being made of a first magnetic material;

(b) a pair of magnetic films, one deposited on each of said magnetic blocks of said pair, each magnetic film being made of a second magnetic material having a high saturation magnetic flux density and a low magnetic permeability compared with said first magnetic material;

(c) said pair of magnetic films including a magnetic gap arranged therebetween; and (d) a pair of nonmagnetic members, one being adjacent to each end of said magnetic gap, in a surface of said head, along which a medium slides;

one of said pair of magnetic films extending between one of said magnetic blocks of said pair and one of said nonmagnetic members of said pair in said surface of said head, along which said medium slides, the boundary between one of said magnetic blocks and one of said magnetic films including a first portion extending along one of said nonmagnetic members and a second portion extending along said magnetic gap and out of alignment with said first portion in said surface of said head, along which said medium slides.

It is a further object of the present invention to provide a magnetic head which is capable of forming the magnetic gap accurately without requiring so high a working accuracy.

Under such object, according to the present invention, there is provided, as an embodiment, a magnetic head comprising:

(a) a pair of magnetic blocks, each being made of a first magnetic material;

(b) a pair of magnetic films, one deposited on each of said magnetic blocks of said pair, each magnetic film being made of a second magnetic material having a high saturation magnetic flux density and a low magnetic permeability compared with said first magnetic material;

(c) said pair of magnetic films including a magnetic gap arranged therebetween; and (d) a pair of nonmagnetic members, one being adjacent to each end of said magnetic gap, in a surface of said head, along which a medium slides;

one of said pair of magnetic films extending between one of said magnetic blocks of said pair and one of said nonmagnetic members of said pair in said surface of said head, along which said medium slides, the boundary between said one of said magnetic blocks and the other of said magnetic films being substantially orthogonal to said magnetic gap near one end of said gap, in said surface of said head, along which said medium slides.

Other objects and features of the present invention will be apparent from the following detailed description of the embodiments thereof taken in conjunction with the accompanying drawings.

DESCRIPTION OF THE PREFERRED EMBODIMENTS

Now embodiments of the present invention will be described.

Figure 4:
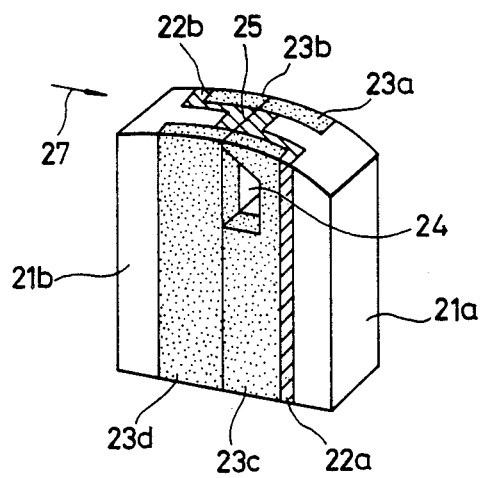
FIG. 4 is a perspective view of a magnetic head as an embodiment of the present invention.

FIG. 4 is a perspective view of a magnetic head as an embodiment of the present invention. FIGS. 5A-5G illustrate the steps of manufacturing the magnetic head shown in FIG. 4.

In FIG. 4, reference numerals 21a, 21b denote oxide magnetic blocks of ferrite or the like; 22a, 22b magnetic metal films of sendust or the like; 23a, 23b, 23c, 23d nonmagnetic material members; 24 a winding window; and 25 a magnetic gap.

In the above magnetic head, the respective contact areas between oxide magnetic blocks 21a, 21b and the corresponding magnetic metal films 22a, 22b are very wide. Thus, the flow of magnetic fluxes is very smooth, thereby providing a good electromagnetic conversion characteristic. The respective thicknesses of magnetic metal films 22a, 22b and the width of the track are irrespective of each other and the time required for forming the films is shortened. Thus the manufacturing time is shortened. The yield is greatly improved, as will be described later.

Figure 5A:
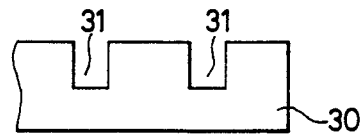
FIGS. 5A-5G illustrate the steps of manufacturing the magnetic head shown in FIG. 4.
Figure 5B:
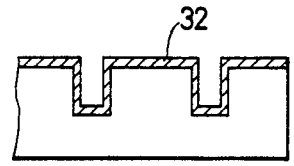
Figure 5C:
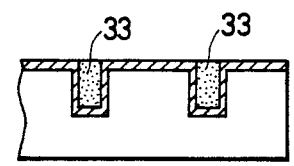

The steps of manufacturing the head of FIG. 4 will be described with reference to FIGS. 5A-5G. A plurality of grooves 31 square in cross section as shown in FIG. 5A are cut in a ferrite block 30 and polished using a plurality of rotating grinding stones disposed at predetermined pitches. A magnetic metal film 32 is formed on the surface of ferrite block 30 with the square grooves 31 therein by sputtering or the like (FIG. 5B). The square grooves 31 coated on side and bottom with magnetic metal film 32 is then filled with melted high melting point glass 33 (FIG. 5C).

Figure 5D:
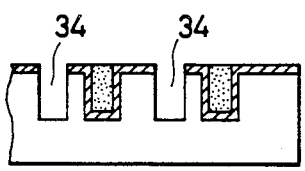
Figure 5E:
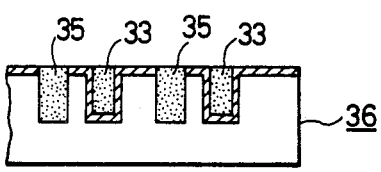
Figure 5F:
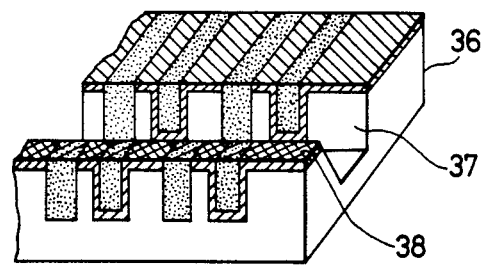
Figure 5G:
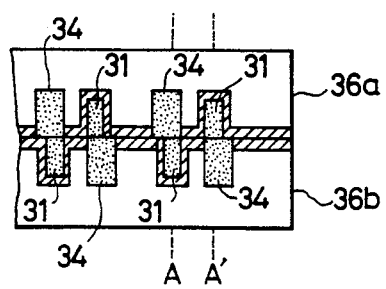

A plurality of square grooves 34 are then formed, each being shifted a fixed distance from the adjacent groove 31 (FIG. 5D). These square grooves 34 are also filled with melted nonmagnetic material such as high melting point glass, and ground using surface polishing so as to obtain a core half block 36 as shown in FIG. 5E. A pair of such core half blocks 36 are prepared, a winding groove 37 is formed in one of the half blocks 36, as shown in FIG. 5F, and a magnetic gap material is applied in the desired thickness onto the surface of that half block 36 to be joined near the medium-sliding surface. The other core half block is then placed opposite to the first mentioned core half block as shown in FIG. 5G and these core halves are joined using a bond such as a low melting point glass. Then, these bonded blocks are cut along the broken lines A, A' to obtain a head core chip as shown in FIG. 4.

In the manufacturing steps, the occurrence of variations in the square grooves 31 or in the depth of grooves 31 would only cause the occurrence of variations in the length of the known magnetic material members 23a, 23b, 23c, 23d in the direction 27 of movement of the medium, and no adverse influence will be exerted on the characteristic of the head.

The respective boundaries between the magnetic metal films 22a, 22b and the corresponding ferrite bodies 21a, 21b are parallel to the magnetic gap, and the respective contact areas between the magnetic metal films 22a, 22b and the corresponding ferrite bodies 21a, 21b are very wide. Thus, no leakage magnetic flux will be produced, which is enough to cause these boundaries to act as dummy gaps and thus, there is no substantial influence exerted on the electromagnetic conversion characteristic.

Figure 6:
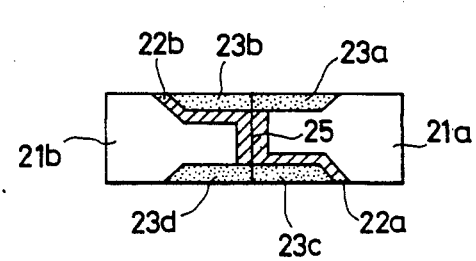
FIGS. 6 and 7 are views of the medium sliding surfaces of magnetic heads as different embodiments of the present invention.
Figure 7:
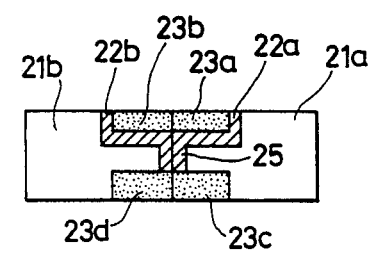
Figure 2A:
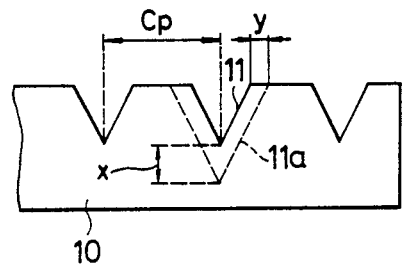
FIGS. 2A-2I illustrate one example of the steps of manufacturing the magnetic head shown in FIG. 1.
Figure 2B:
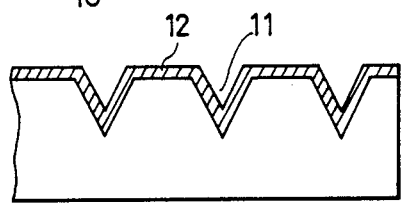
Figure 2C:
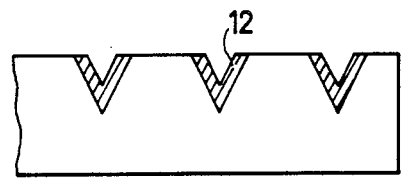
Figure 2D:
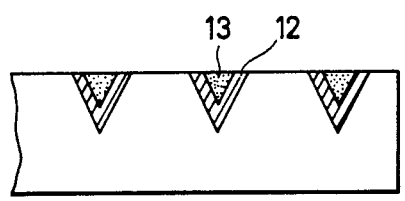
Figure 2E:
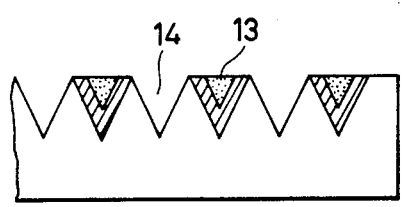
Figure 2F:
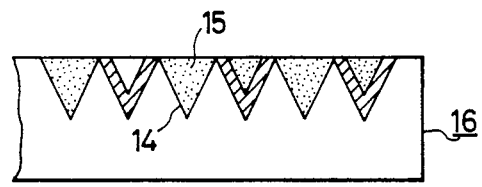
Figure 2G:
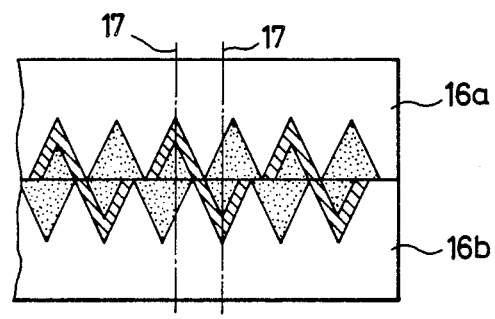
Figure 2H:
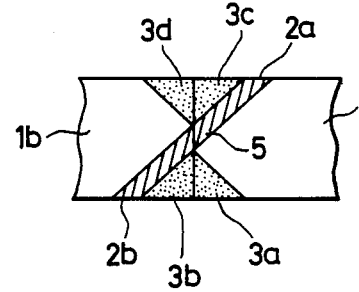
Figure 2I:
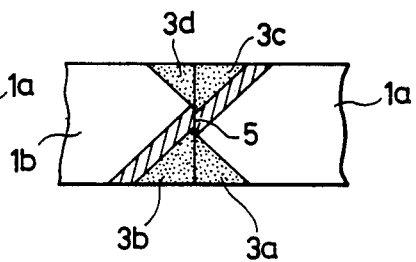
Figure 3A:
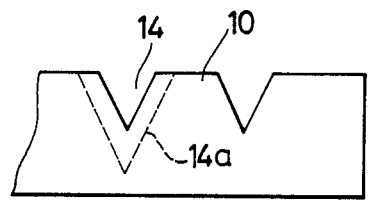
FIGS. 3A-3J illustrate another example of the steps of manufacturing the magnetic head shown in FIG. 1.
Figure 3B:
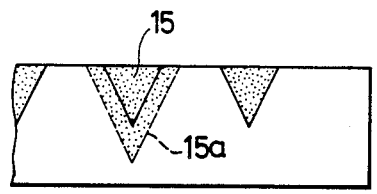
Figure 3C:
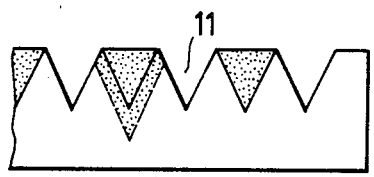
Figure 3D:
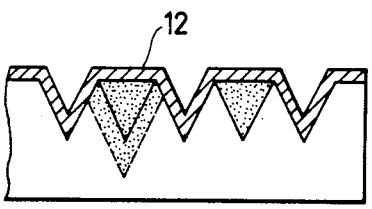
Figure 3E:
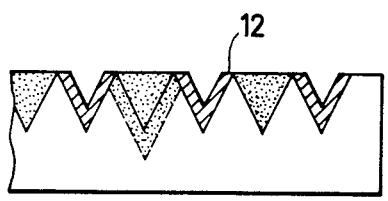
Figure 3F:
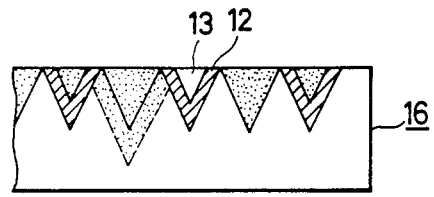
Figure 3G:
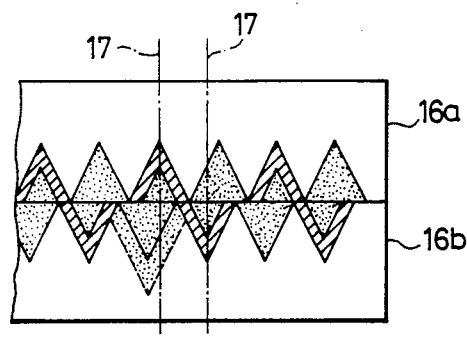
Figure 3H:
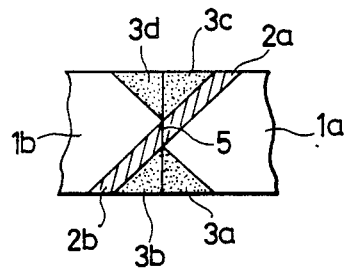
Figure 3I:
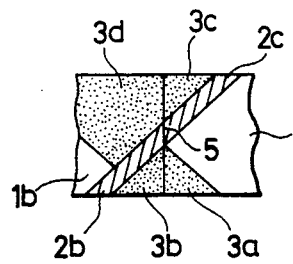
Figure 3J:
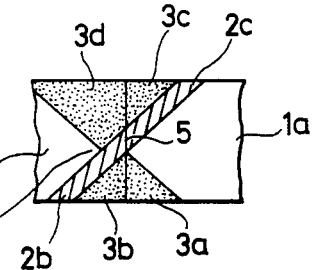

FIGS. 6 and 7 are views of the medium-sliding surfaces of the magnetic heads as other embodiments of the present invention. Like reference numerals denote like components in FIGS. 6, 7 and 4. In the head of FIG. 6, the end portions of the nonmagnetic members 23a, 23b, 23c and 23d remote from the magnetic gap 25 taper so as to provide a smooth flow of magnetic fluxes and an improved electromagnetic conversion characteristic compared with the head of FIG. 4. The head of FIG. 6 can be manufactured by forming grooves having V-like bottoms instead of the corresponding grooves 31 and 34 having square bottoms shown in FIGS. 5A and 5D.

The head of FIG. 7 has magnetic metal films 22a and 22b which include portions extending on the same side. This structure is obtained by placing opposite to each other the square grooves 31 coated with magnetic metal films in the core half blocks 36a and 36b of FIG. 5G.

Figure 8:
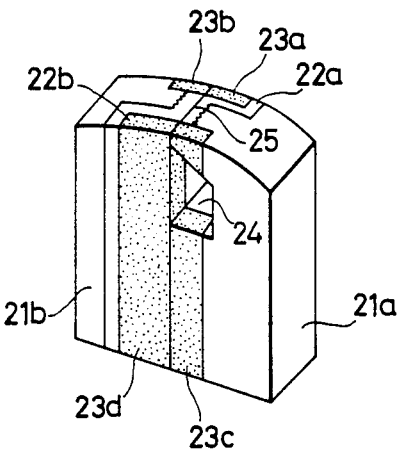
FIG. 8 is a perspective view of a magnetic head as still another embodiment of the present invention.

FIG. 8 is a perspective view of a magnetic head as a further embodiment of the present invention. Like reference numerals denote like components in FIGS. 8 and 4. FIGS. 9A-9F illustrate the steps of manufacturing the head shown in FIG. 8.

In the head shown in FIG. 8, the respective surface portions of ferrite blocks 21a, 21b, parallel to the magnetic gap 25 at the corresponding boundaries between the magnetic metal films 22a, 22b and the ferrite bodies 21a, 21b shown in FIG. 4 have V-like grooves at pitches of about 5 μm in order to reduce an adverse influence of the boundaries on the electromagnetic conversion characteristic.

The manufacturing steps shown in FIGS. 9A-9F are similar to those shown in FIGS. 2A-2G except for the step of forming V-like grooves 39 at pitches of about 5 μm on the surfaces of the ferrite blocks on which the square grooves are formed, using a shaping grinding stone (dimming saw). Thus, a more detailed description will be omitted. However, the step of filling the square grooves 34 with nonmagnetic material 35 is performed after the winding groove 37 and a magnetic gap material 38 are formed.

Figure 10:
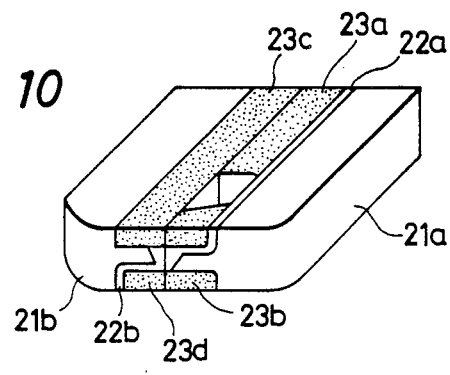
FIG. 10 is a perspective view of a magnetic head as a further embodiment of the present invention.
Figure 12:
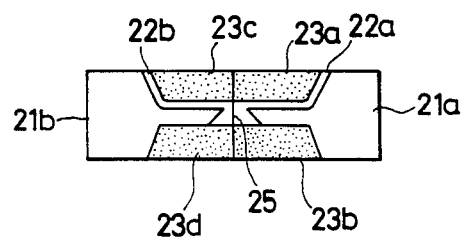
FIGS. 12-17 illustrate modifications of the magnetic head shown FIG. 10.
Figure 13:
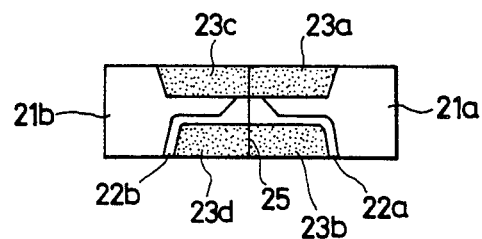
Figure 9A:
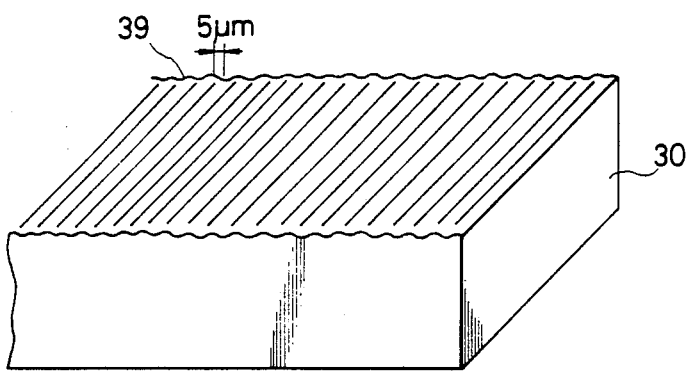
FIGS. 9A-9F illustrate one example of the steps of manufacturing the magnetic head shown in FIG. 8.
Figure 9B:
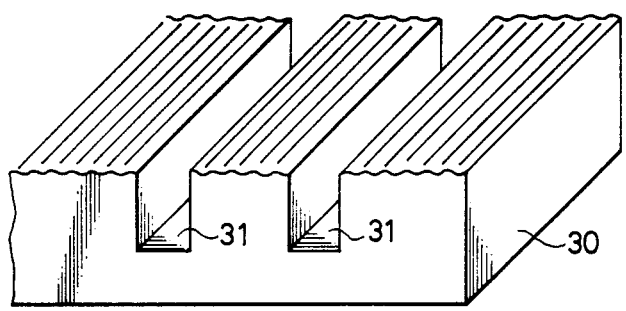
Figure 9C:
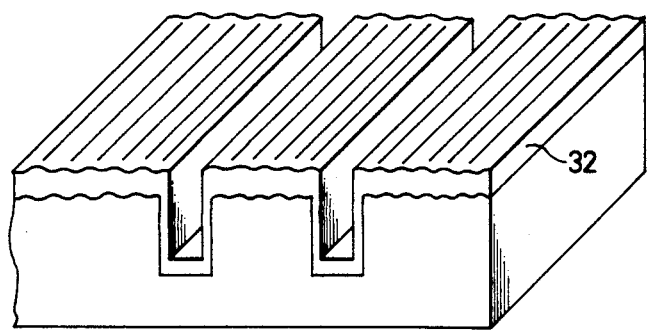
Figure 9D:
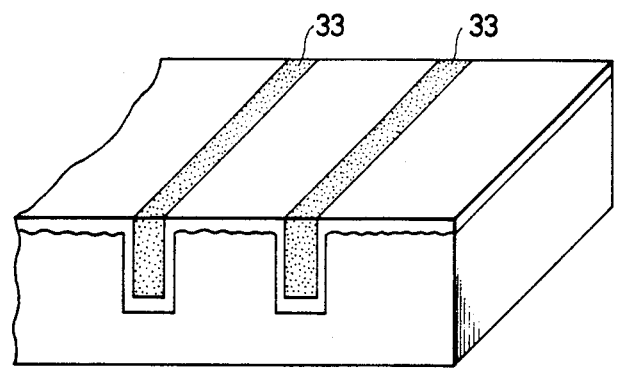
Figure 9E:
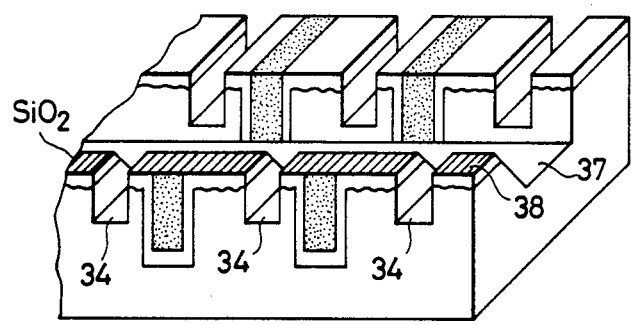
Figure 9F:
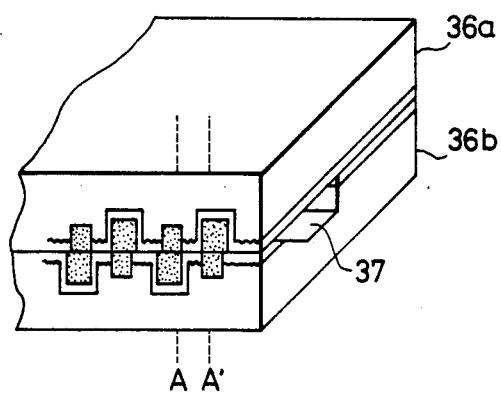

FIG. 10 is a perspective view showing the structure of a magnetic head as a further embodiment of the present invention. Like reference numerals denote like components in FIGS. 10 and 4 and a more detailed description will be omitted. The head in FIG. 10 is obtained by rendering, non-parallel to the gap, the respective portions of the boundaries between the magnetic metal films 22a, 22b and ferrite portion 21a, 21b while those portions in the head shown in FIG. 4 are parallel to the gap. Of course, this is based on the same reason as in the head of FIG. 8.

Figure 11A:
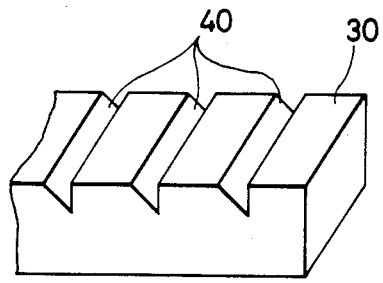
FIGS. 11A-11L illustrate one example of the steps of manufacturing the magnetic head shown in FIG. 10.
Figure 11B:
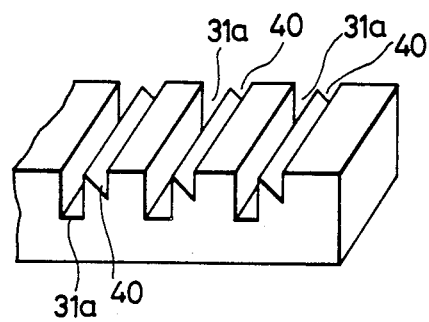
Figure 11C:
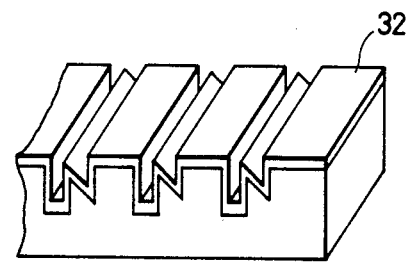
Figure 11D:
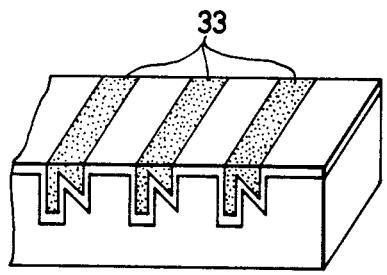
Figure 11E:
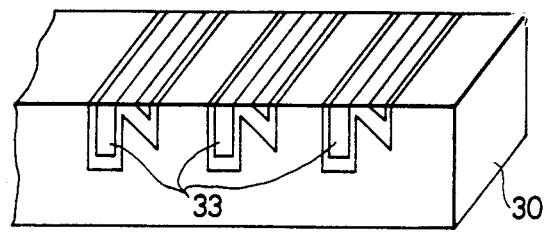
Figure 11F:
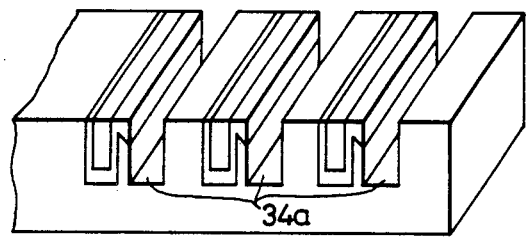
Figure 11G:
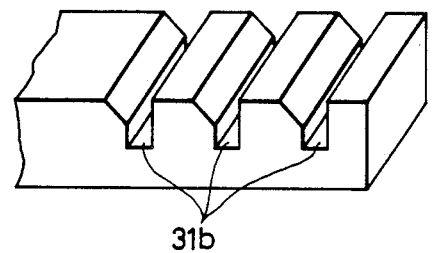
Figure 11H:
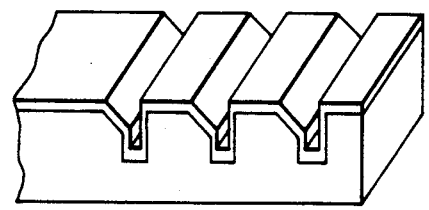
Figure 11I:
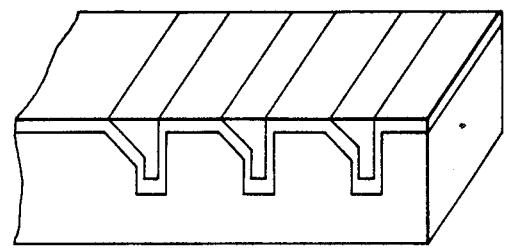
Figure 11J:
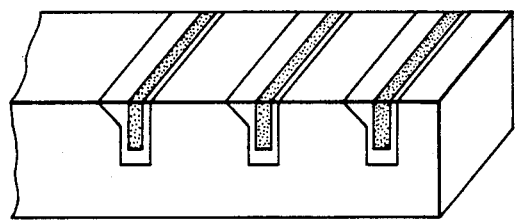
Figure 11K:
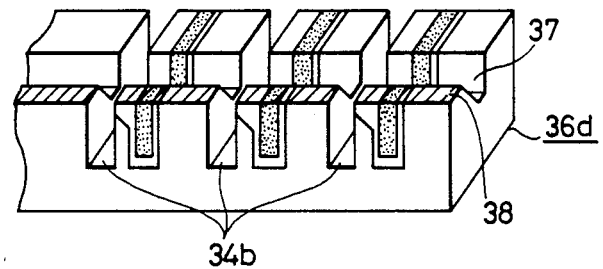
Figure 11L:
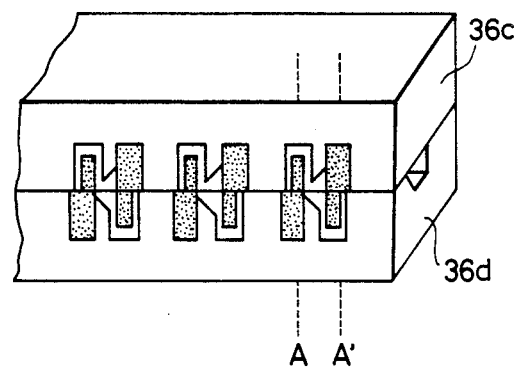
Figure 14:
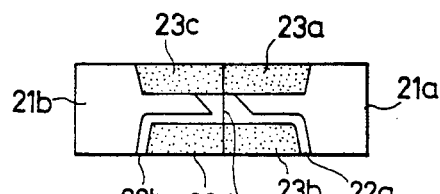
Figure 15:
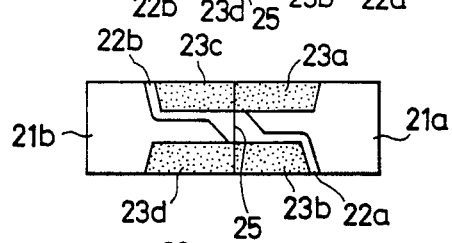
Figure 16:
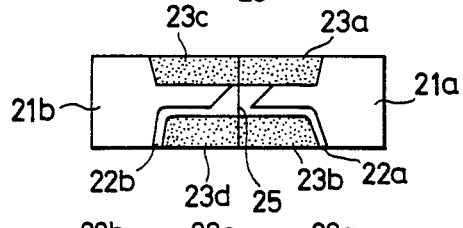
Figure 17:
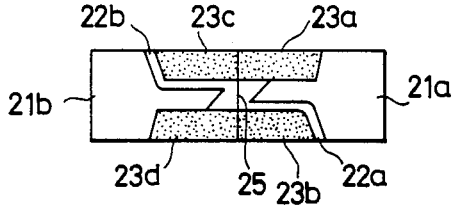

FIGS. 11A-11L illustrate the steps of manufacturing the magnetic head of FIG. 10. These manufacturing steps will be described next. A plurality of triangular grooves 40 are formed on the ferrite block 30 at predetermined intervals. A plurality of square grooves 31a are formed, one being adjacent a less inclined bottom portion of each triangular groove 40, and these grooves are covered with a magnetic metal film 32 (FIGS. 11B and 11C). In addition, these grooves are filled with melted nonmagnetic material 33 and the resulting surface is then polished by using surface grinding (FIGS. 11D and 11E). Then a plurality of square grooves 34a are formed, one being adjacent a vertical side portion of each triangular groove. These grooves 34a are filled with a melted nonmagnetic material to obtain one core half block 36c (FIG. 11L).

On the other hand, as shown in FIGS. 11G-11K, now, a plurality of square grooves 31b are formed in another ferrite block, one being situated at the deepest portion of each triangular groove 40. These grooves 31b are then coated with a magnetic metal film and then filled with a nonmagnetic material. A plurality of square grooves 34b are formed, one overlapping a less inclined bottom portion of each triangular groove 40. These grooves 34b are then filled with a nonmagnetic material to obtain the other core half block 36d. It should be noted that immediately before the square grooves 34b are filled with the nonmagnetic material, a winding groove 37 is formed in the core half block 36d and that magnetic gap material 38 is provided to the desired thickness.

These core half blocks 36c and 36d are joined opposite to each other, as shown in FIG. 11L, and then the resulting product is cut along the broken lines A, A' to obtain a magnetic head core chip, as shown in FIG. 10. This head also acts to reduce an adverse influence exerted by the respective boundaries between the magnetic metal films 22a, 22b and the ferrite portions 21a, 21b on the electromagnetic conversion characteristic of the core chip. Of course, the yield is very high as in the head shown in FIG. 4.

FIGS. 12-17 illustrate modifications of the magnetic head shown in FIG. 10. These modifications each include assembled core half blocks shown by 36c and 36d in FIG. 11L.

It should be noted that the forms of nonmagnetic material members are not limited to those of the above embodiments. If the nonmagnetic material members are substantially perpendicular to the magnetic gap, an effect will result which is similar to the above effect of improving the yield.

Figure 18:
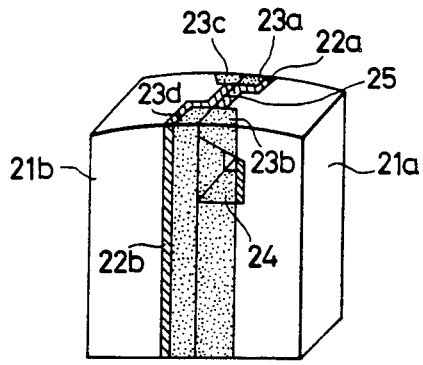
FIG. 18 is a perspective view of a magnetic head as a still further embodiment of the present invention.

FIG. 18 is a perspective view of a magnetic head as a further embodiment of the present invention. FIGS. 19A-19G illustrate one example of the steps of manufacturing the magnetic head shown in FIG. 18. Like reference numerals denote like components in FIGS. 18, 19A-19G and FIGS. 4, 5A-5G.

Figure 19A:
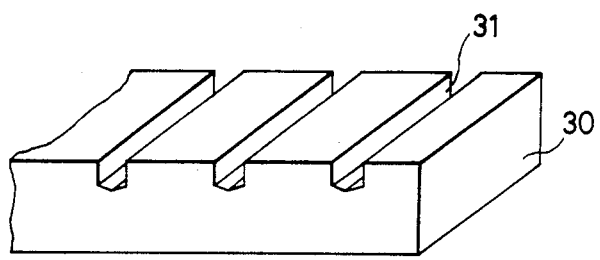
FIGS. 19A-19G illustrate one example of the steps of manufacturing the magnetic head shown in FIG. 18.
Figure 19B:
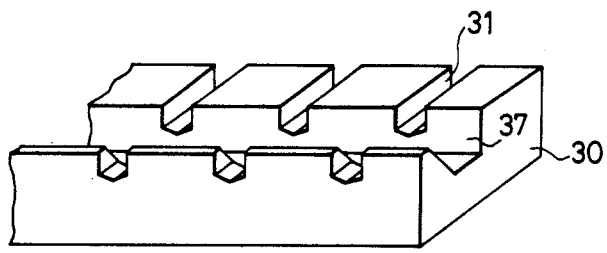
Figure 19C:
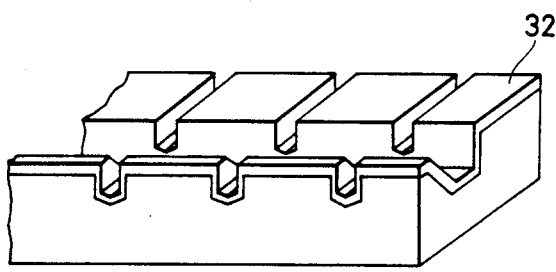
Figure 19D:
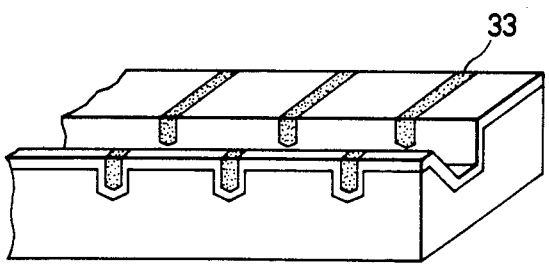
Figure 19E:
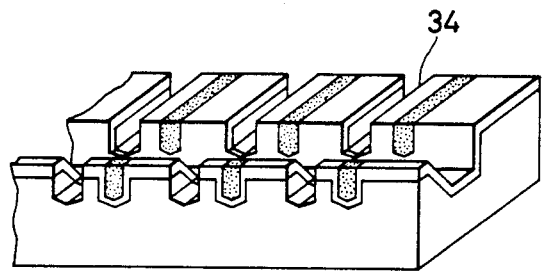
Figure 19F:
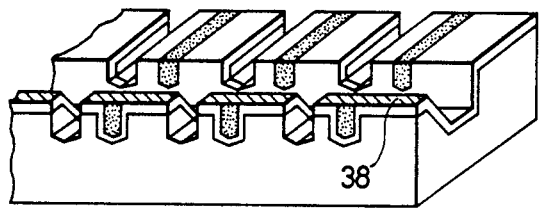
Figure 19G:
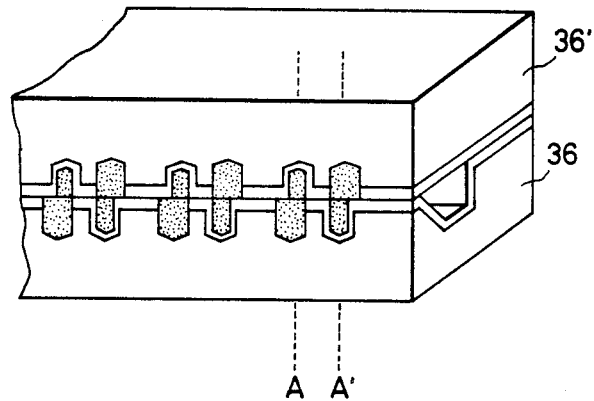

The magnetic head shown in FIG. 18 includes a magnetic metal film formed on the winding window 24 in the ferrite block and differs from the magnetic head shown in FIG. 4. Correspondingly, in the manufacturing process, as shown in FIGS. 19A and 19B, a winding groove 37 is formed in ferrite block 30 with a plurality of grooves 31 formed therein at predetermined pitches. Magnetic metal film 32 is formed on that surface of the ferrite block 30 in which grooves 30 and winding groove 37 are formed, as shown in FIG. 19C. The manufacturing steps of FIGS. 19D-19G are similar to those of FIG. 5 and a more detailed description will be omitted.

In the magnetic head shown in FIG. 18, the contact area between ferrite block 30 and magnetic metal film 32 is larger than that in the magnetic head shown in FIG. 5, so that the electromagnetic characteristic is further improved. On the other hand, since the accumulation of internal stress increases, the magnetic metal films should be as thin as possible.

Figure 20:
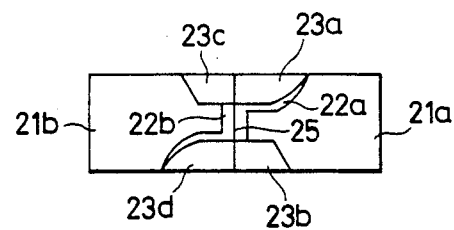
FIGS. 20 and 21 show other magnetic heads obtained using a manufacturing method similar to that described with respect to FIG. 19.
Figure 21:
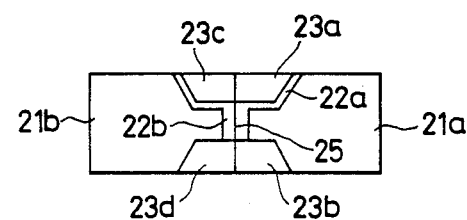

FIGS. 20, 21 show the medium-sliding surfaces of other magnetic heads which can be manufactured using a manufacturing method similar to that disclosed in FIG. 19. Like reference numerals denote like components in FIGS. 20, 21 and 18. In the head of FIG. 20, the end portions of the magnetic metal film 22a, 22b remote from magnetic gap 25 are gradually thinned so as to provide a smooth flow of magnetic fluxes and an improved electromagnetic conversion characteristic compared with the head of FIG. 18.

The head of FIG. 20 can be manufactured by slightly changing the form of grooves 31, for example, inclining the direction of sputtering a magnetic metal to form the magnetic metal film, relative to the direction in which the grooves 31 extend.

The head of FIG. 21 has extensions of magnetic metal films 22a, 22b on the same side. This head is obtained by joining core half blocks 36a and 36b of FIG. 5G so that the square grooves 31, covered with magnetic metal film in those half blocks are disposed opposite to each other.

Figure 22:
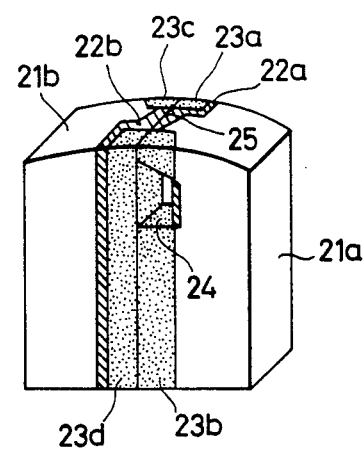
FIG. 22 is a perspective view of a magnetic head as a further embodiment of the present invention.
Figure 23A:
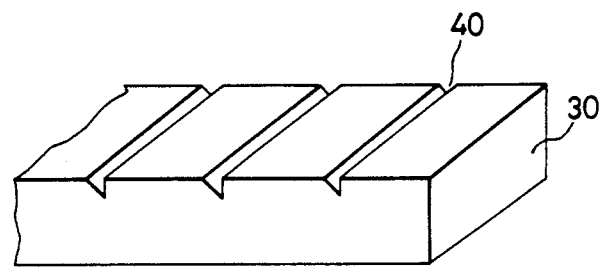
FIGS. 23A-23I illustrate one example of the steps of manufacturing the magnetic head shown in FIG. 22.
Figure 23B:
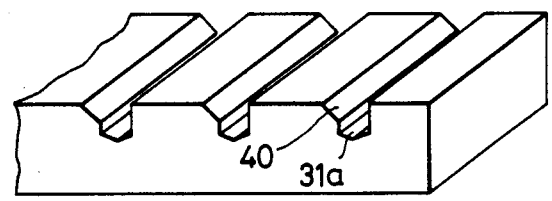
Figure 23C:
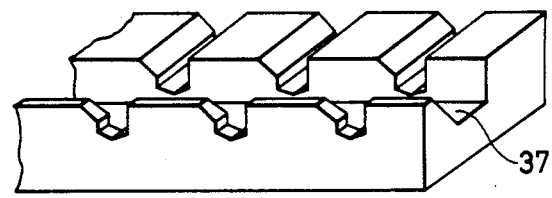
Figure 23D:
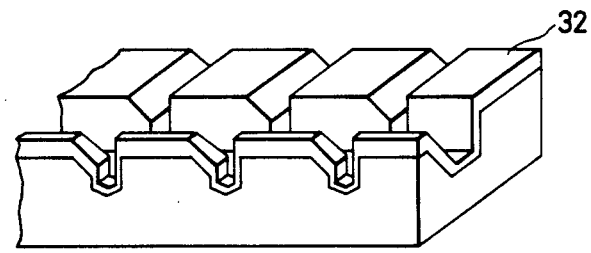
Figure 23E:
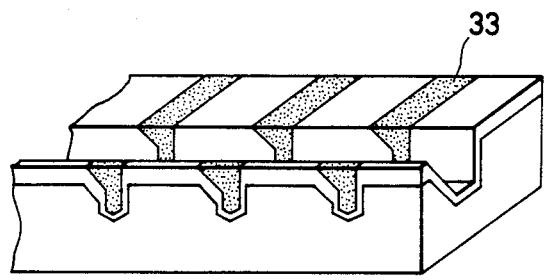
Figure 23F:
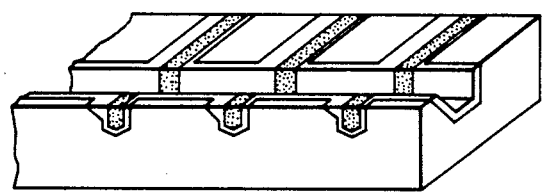
Figure 23G:
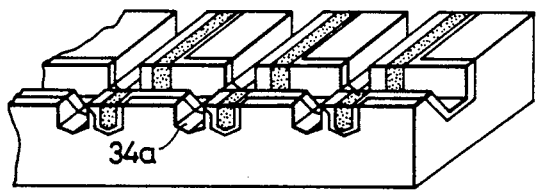
Figure 23H:
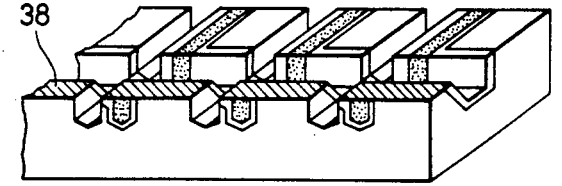
Figure 23I:
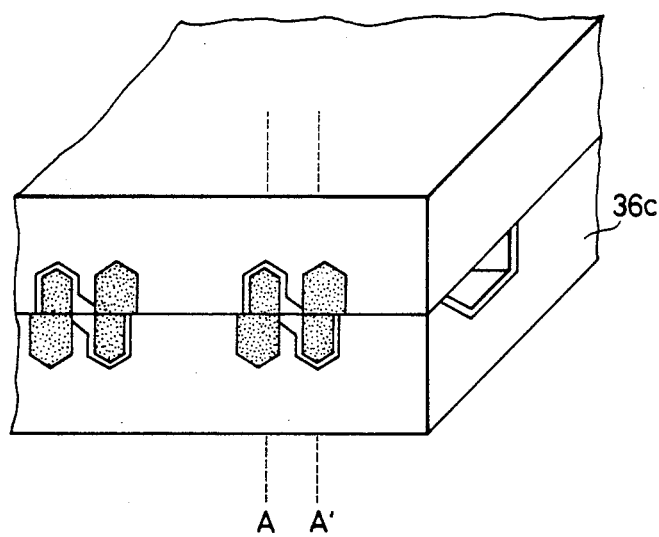

FIG. 22 illustrates a magnetic head as a further embodiment of the present invention. FIGS. 23A-23I illustrate one example of the steps of manufacturing the magnetic head shown in FIG. 22. In the head of FIG. 22, the portions of the respective boundaries between magnetic metal films 22a, 22b and ferrite members 21a, 21b of the head 18 are not parallel to the magnetic gap while the corresponding portions of the boundaries in the head of FIG. 18 are parallel to the magnetic gap of FIG. 18. This causes the former to further reduce the affect of leakage fluxes produced from the boundaries between magnetic films 22a, 22b and ferrite members 21a, 21b on the electromagnetic conversion characteristic of the head compared with the latter.

Figure 24:
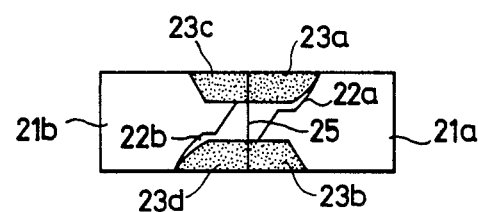
FIGS. 24 and 25 illustrate other examples of magnetic heads obtained using a manufacturing method similar to that described with respect to FIG. 23.
Figure 25:
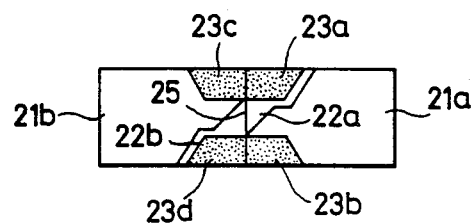

FIGS. 24 and 25 illustrate the medium sliding surfaces of the heads obtained by manufacturing steps similar to those shown in FIG. 23. Like reference numerals denote like components in FIGS. 24, 25 and 18. In the head of FIG. 24, the magnetic metal films 22a, 22b have portions thinned or gradually thinned as they extend away from the magnetic gap 25, as in the head of FIG. 20. The head of FIG. 25 includes ferrite members 21a and 21b, the ends of which are adjacent the magnetic gap.

Figure 26:
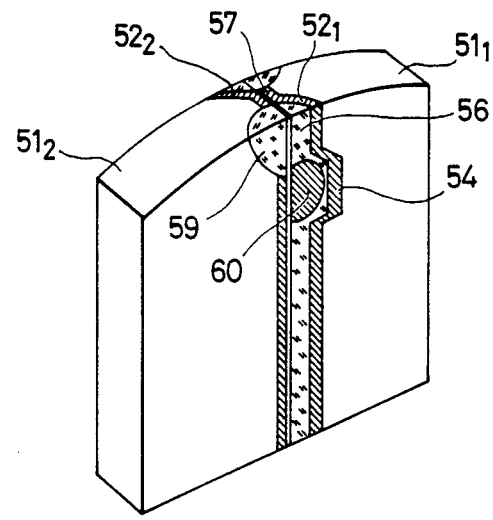
FIG. 26 is a perspective view showing the structure of a magnetic head as a further embodiment of the present invention.

FIG. 26 is a perspective view outlining a magnetic head as a further embodiment of the present invention.

In FIG. 26, reference numeral 51 ($51_1$, $51_2$) denotes a high magnetic permeability material, for example, of a single crystal ferrite (a first magnetic material). Reference numeral 52 ($52_1$, $52_2$) denotes an alloy magnetic material having a high saturation magnetic flux density, such as permalloy, sendust or amorphous material (a second magnetic material), formed by physical evaporation, such as sputtering on the high magnetic permeability material. Reference numeral 57 denotes an operating magnetic gap including a film, for example, 0.2–0.3 μm thick, of a nonmagnetic material such as $SiO_2$ according to the given design. Reference numeral 54 denotes a winding window groove. Reference numeral 56 denotes first low melting point glass. Reference numeral 59 denotes low melting point glass which has a melting point approximately equal to or lower than that of the glass 56. Reference numeral 60 denotes a winding window.

Figure 27:
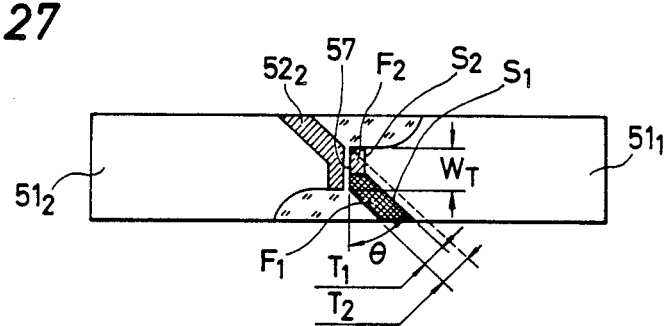
FIG. 27 is a plan view briefly showing the structure of the medium-sliding surface of the head shown in FIG. 26.

The structural features of this head will be described with respect to FIG. 27 showing the forms of individual components appearing on the medium-sliding surface of the head. In FIG. 27, the feature of the cross-sectional shape of sendust film 52 appearing on the medium-sliding surface is that the cross-sectional shape includes an inclined area $F_1$ (cross-hatched portion) extending outward from one end of gap 57 at an angle to the gap and an area $F_2$ parallel to gap 57 (hatched portion) The boundary $S_1$ (the extending portion) between the inclined area $F_1$ and ferrite 51 in this embodiment is inclined at $\theta = 45°$ to the gap 57 while the boundary $S_2$ (parallel portion) between area $F_2$ and ferrite 51 is parallel to gap 57. The track width $W_T$ is 30 μm. In this case, in a head such as that shown in FIG. 9, the film thickness $T_2 = W_T \sin \theta = 30$ μm/$\sqrt{2} \approx 21$ μm. while in the head of this embodiment, the film thickness $T_1$ is thinner than $T_2$, i.e., 14 μm.

The area $F_2$ has a width of 10 μm perpendicular the gap and a length of 20 μm parallel to the gap. Since the boundary $S_2$ between area $F_2$ and ferrite $51_1$ is parallel to the gap, a longer parallel boundary will produce a larger contour effect, and the peak-to-peak value of a ripple produced on the frequency-output characteristic curve increases. If this ripple is below about 2 dB, a video reproduction image will not be adversely influenced.

The advantages deriving from the structural features of this head lie in the simplicity of the manufacturing process. These advantages will be described with reference to FIGS. 28A–28D showing the main manufacturing steps.

Figure 28A:
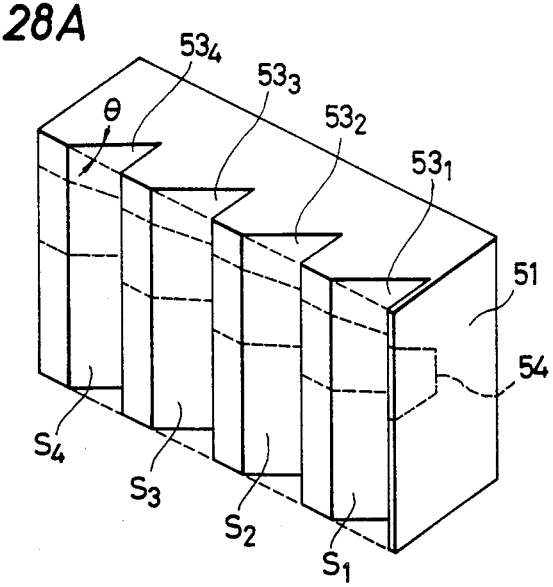
FIGS. 28A-28D illustrates the main steps of manufacturing the head of FIG. 26.

In FIG. 28a, reference numeral 51 denotes a portion of a single crystal rectangular parallelepiped ferrite, on one surface of which are provided a multiplicity of first parallel grooves $53_1$–$53_4$, each having a V-like cross section. The respective inclined surfaces $S_1$–$S_4$ of the grooves $53_1$–$53_4$ intersect the groove forming surface at an angle $\theta$ of more than 10°, preferably 40°–60°. Winding window groove 54 is then formed in the groove forming surface so that sendust film 52 is on the inclined surfaces $S_1$–$S_4$ are about 14 μm thick.

Figure 28B:
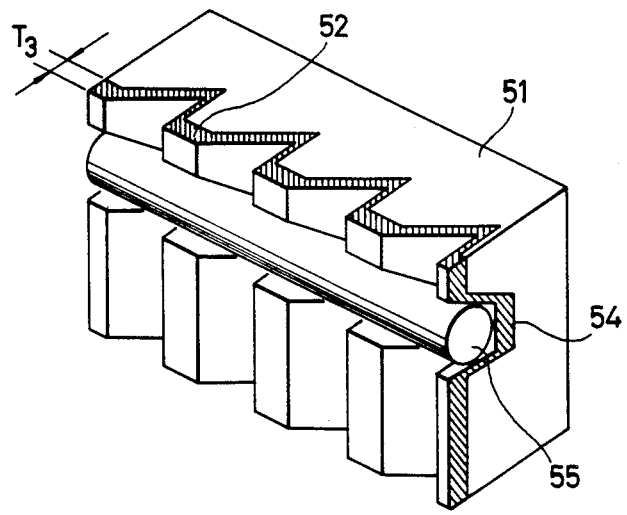

FIG. 28B shows a metal rod 55, for example, of aluminum received in groove 54 with the sendust film 52 therein. The thickness $T_3$ of the sendust film formed on the block surface portions, for example, facing the gap, other than the inclined groove surfaces in the ferrite block 51 is greater than several tens of percent than the thickness of the film on the inclined groove surfaces, and when $\theta = 45°$, $T_3 = 18$ μm, i.e., is greater approximately 20%.

The advantage in the manufacturing of this head is that a head can be produced, because a metal film formed on the inclined groove surfaces can be thinned, even if a sendust film is formed in the winding window groove. In the prior art, if a film having a thickness not less than 20 μm is formed on the inclined groove surfaces, a maximum film thickness of 25 μm could be formed on the surfaces of the walls forming the winding window groove 4 and facing the gap. Thus, at the later glass fusing stage, cracks may be produced around the groove 4 in the ferrite block due to thermal stress, and the yield would be reduced. Thus, in order to avoid the formation of sendust film on the winding window groove 54, in FIG. 28A, sendust film is formed on the groove forming surface after first grooves $53_1$–$53_4$ are formed in the ferrite block 51, and then the winding window groove is formed. In these steps, since the grinding stone forming the winding window groove cuts different materials, i.e., sendust and ferrite, it is rapidly consumed. In contrast, with the head of this embodiment, in FIG. 28A, immediately after first grooves $53_1$–$53_4$ are formed, winding window groove 54 shown by broken lines, can be formed and this formation is required in the ferrite block alone. Thus, the service life of the grinding stone can be prolonged. That is, one advantage is that winding window groove 4 is formed in the ferrite block, while the sendust film is being formed obtained by filling up the first grooves $53_1$–$53_4$ with the sendust film already deposited thereon and the winding window groove together with an aluminum rod 55 therein with first low melting point glass 56, lapping the resulting surface to form a surface to be joined, and forming second grooves $58_1$, $58_2$ to work a track width. If the thickness of the remaining film after lapping to form a surface to be joined is $T_4$ in FIG. 28C, lapping must be performed until at least $T_4 = 0$ in order to manufacture the head of FIG. 9. In contrast, in the head of this embodiment, the film thickness $T_3$ (of 18 μm) is only required to be lapped up to 10 μm and thus the lapping time is greatly reduced Namely, another advantage is that the time required for lapping a surface to be joined is shortened.

Figure 28C:
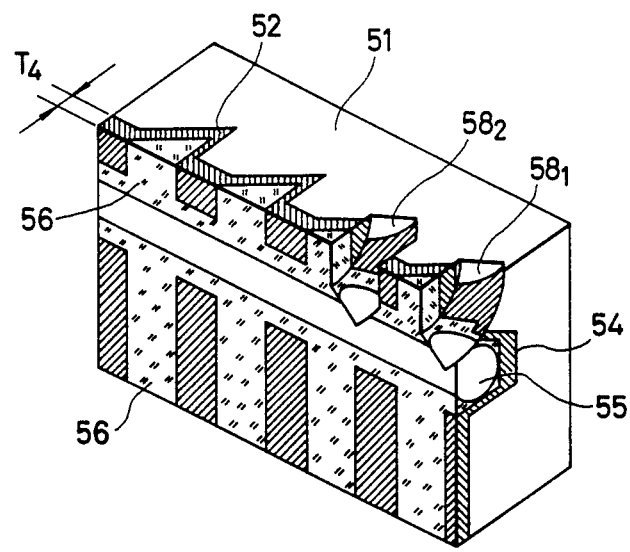
Figure 28D:
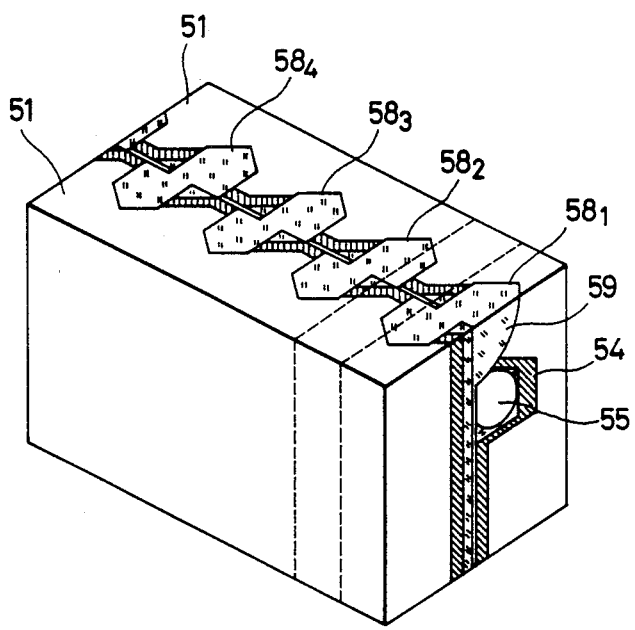
Figure 30:
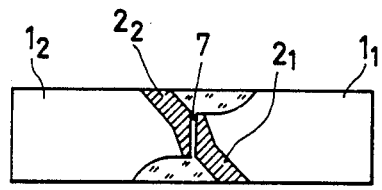
Figure 31:
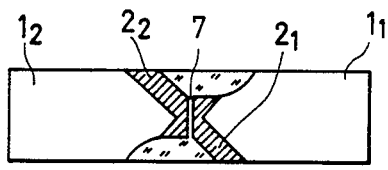
Figure 32:
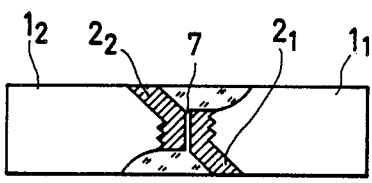
Figure 33:
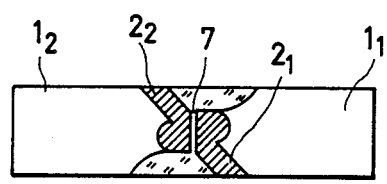
Figure 34:
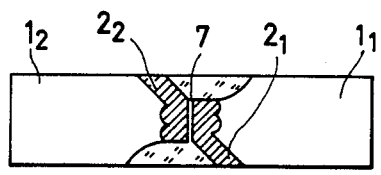

FIG. 28D shows a product manufactured by forming all second grooves $58_1$, $58_2$ . . . in FIG. 28C, applying a film of about 0.2 μm of a nonmagnetic material, for example, of $SiO_2$, to a surface to be joined, placing a block similar to that of FIG. 28C, but having no winding groove therein, opposite to the block of FIG. 28C, and fusing both blocks with second glass 59 which has a low melting point equal to or lower than that of the first glass by means of second grooves $58_1$–$58_4$. These joined blocks are cut along the two broken lines shown in FIG. 28d which are perpendicular to the joined surfaces The aluminum rod embedded in the winding window groove is then dissolved by an alkali solution to form the winding window. Then, required working is performed on the medium-sliding surface to form a final head chip shown in FIG. 26. In order to form an azimuth on the head, the cross sections along which the joined blocks are cut should be inclined relative to the gap surface as needed.

As will be clear from the manufacturing process mentioned above, generally speaking, a MIG head is manufactured by working three physically and chemically different materials, i.e., metal, ferrite and glass, into complicated configurations and joining them. In the course of manufacturing, the head is subjected to a severe manufacturing method which includes the glass fusing process which includes heating the components of the head from the normal temperature up to 600° C. and then cooling them down to the normal temperature, and the mechanically working process which includes forming grooves and cutting the joined blocks Therefore, internal stress is accumulated. When this internal stress is released, cracks may be produced in the ferrite blocks or glass and the yield may greatly be lowered. Such a phenomenon can be seen more often in a thicker formed magnetic film. In the head according to the present invention, as described with reference to FIG. 2, the formed alloy magnetic film can be thinned and as the film become thin, the yield is increased. That is, another advantage in manufacturing the head is that the alloy magnetic film can be thinned, and the time required for forming the film can be shortened. A third advantage is that the ferrite blocks and glass can be prevented from being cracked and thus, the total yield is improved.

Simplification of the manufacturing process, shortening of the working time, and improvement to the yield result in a reduction of the cost of the head.

Figure 29:
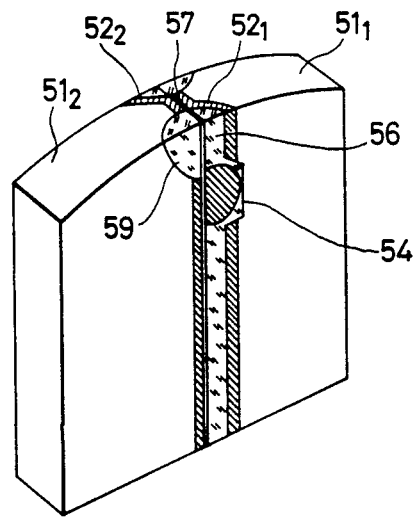
FIGS. 29-35 illustrate embodiments obtained by partially modifying the structure of the magnetic head of FIG. 26.

FIG. 29 illustrates a head as another embodiment of the present invention. The head of FIG. 29 is different in structure from that of FIG. 26 in that in the head of FIG. 29, the track width is 26 μm, which is twice that of the head of 26, and that the wall 4 of the winding window groove is not covered with an alloy magnetic film.

In order to work the track width at 60 μm in the head of FIG. 26, an alloy magnetic film having a thickness not less than 40 μm is required to be applied to the core side portion inclined to the gap (area $F_1$ in FIG. 27). In contrast, in the head of this embodiment, the thickness of the area $F_1$ is about 20 μm, the remaining track width portion can be compensated by the area parallel to the gap ($F_2$ in FIG. 27). Thus, heads having a wide track width are obtained easily with high yield.

For an alloy magnetic film which is thicker than 25 μm at the inclined area $F_1$, less cracks would be produced in the ferrite blocks, thereby resulting in high yield if no alloy magnetic film is deposited on the surface of the winding window groove, as shown in the head of FIG. 29.

However, for the electromagnetic conversion characteristic, if an alloy magnetic film is deposited on the surface of the groove wall of the winding window groove, especially, on the surface inclined to the gap, the output of the head will be slightly increased and the contour effect will slightly be reduced than otherwise, provided that the gap depths are the same.

FIGS. 30-35 illustrate further embodiments of the present invention, in which the alloy magnetic films in the medium-sliding surfaces of the heads are different, especially in form from each other.

The forms of the alloy magnetic films of FIGS. 30-34 can be said to be an alteration of the form of the gap-parallel boundary $S_2$ between the alloy magnetic film and the ferrite block (associated with the gap parallel area $F_2$ in FIG. 27) to various nonparallel forms. Such alteration of the boundary renders the manufacturing process complicated, but the occurrence of the contour effect can be further suppressed.

Figure 1:
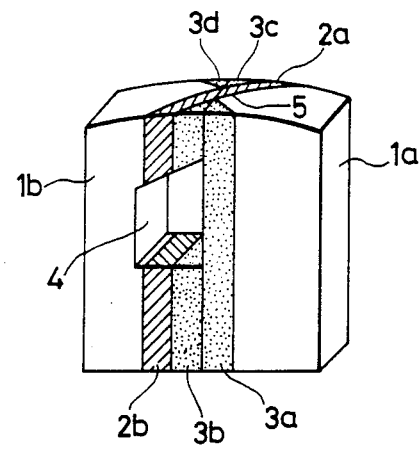
FIG. 1 is a perspective view of a conventional magnetic head.
Figure 35:
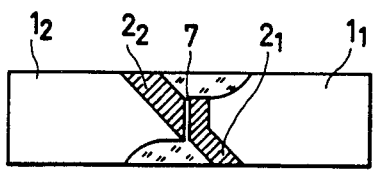

It should be noted that the alloy magnetic films $52_1$ and $52_2$ in the heads of FIGS. 27 and 30-34 are in point symmetry relationship with reference to the center of the gap. These alloy magnetic films may be provided in line symmetry relationship with reference to the gap 57. Alternatively, the forms of the alloy magnetic films on both the core halves may be different from each other. In the head of FIG. 35, one core half with no winding window includes a core half similar to that in FIG. 1, and the other core half with the winding window includes a core half similar to that of FIG. 2B. The ferrite block with no winding window groove is subjected to a low working stress compared with the ferrite block with the window groove. Thus, a relatively high yield of heads results, even if the thickness of alloy magnetic film on the core portion is thick. The winding window groove may be provided not only in one of the core halves, but also in each of the core halves.

What is claimed is:

1. A magnetic head comprising:
   a pair of magnetic blocks, each being made of a first magnetic material;
   a pair of magnetic films, one deposited on each of said magnetic blocks of said pair, each magnetic film being made of a second magnetic material having a high saturation magnetic flux density and a low magnetic permeability compared with said first magnetic material;
   said pair of magnetic films including a magnetic gap arranged therebetween; and
   a pair of nonmagnetic members, each one of said pair of nonmagnetic members abuts an end of said magnetic gap in a surface of said head, along which a medium slides;
   each of said pair of magnetic blocks having a given width generally parallel to the magnetic gap;
   each of said pair of magnetic films extending across only a portion of the width of a respective one of said pair of magnetic blocks;
   wherein each of said pair of magnetic films includes a first elongated portion extending between a respective one of said nonmagnetic members and the respective one of said pair of magnetic blocks and a second portion being disposed along said magnetic gap, said first elongated portion of each of said pair of magnetic films extending, in the surface of the head, substantially parallel to a sliding direction of the medium.

2. A head according to claim 1, wherein at least one of said portions is parallel to said magnetic gap in said surface of said head, along which said medium slides.

3. A head according to claim 1, wherein at least one of said second portions comprises a section that extends at an angle to said magnetic gap in said surface of said head, along which said medium slides.

4. A head according to claim 3, wherein said at least one of said second portions comprises a pattern repeated at a predetermined pitch in said surface of said head, along which said medium slides.

5. A head according to claim 1, wherein at least one of said first portions is parallel to a boundary between one of said nonmagnetic members and one of said magnetic films in said surface of said head, along which said medium slides.

6. A head according to claim I, wherein at least one of said first portions approaches a boundary between one of said nonmagnetic members and a third portion of one of said magnetic films as said first portion extends away from said magnetic gap in said surface of said head, along which said medium slides.

7. A head according to claim 1, wherein a boundary between one of said nonmagnetic members and one of said magnetic films is inclined at angle of 40 to 60 degrees to said magnetic gap, in said surface of said head, along which said medium slides.

8. A head according to claim 1, wherein a boundary between one of said nonmagnetic members and one of said magnetic films forms an angle of approximately 50 degrees with said magnetic gap, in said surface of said head, along which said medium slides.

9. A head according to claim 1, wherein one of said magnetic blocks comprises a groove to accommodate a winding and wherein one of said magnetic films is also deposited on the bottom of said groove.

10. A head according to claim 1, wherein one of said magnetic blocks comprises a groove to accommodate a winding and wherein the bottom of said groove is free of said magnetic film.

11. A head according to claim 1, wherein said first magnetic material comprises single crystal ferrite.

12. A head according to claim 11, wherein said second magnetic material comprises sendust alloy.

13. A magnetic head comprising:
a pair of magnetic blocks, each being made of a first magnetic material;
a pair of magnetic films, one deposited on each of said magnetic blocks of said pair, each magnetic film being made of a second magnetic material having a high saturation magnetic flux density and a low magnetic permeability compared with said first magnetic material;
said pair of magnetic films including a magnetic gap arranged therebetween; and
a pair of nonmagnetic members, each one of said pair of nonmagnetic members abuts an end of said magnetic gap in a surface of said head, along which a medium slides;
each of said pair of magnetic blocks having a given width generally parallel to the magnetic gap;
each of said pair of magnetic films extending across only a portion of the width of a respective one of said pair of magnetic blocks;
wherein each of said pair of magnetic films includes a first elongated portion extending between a respective one of said pair of nonmagnetic members and the respective one of said pair of magnetic blocks and a second portion being disposed along said magnetic gap, and wherein a boundary, formed between at least one of said first elongated portions of said pair of magnetic films and a corresponding one of said pair of nonmagnetic members, in the surface of the head, is substantially orthogonal to said magnetic gap adjacent one of said ends of said magnetic gap.

14. A head according to claim 13, wherein the thickness of the portion of said magnetic film extending between said one of said magnetic blocks of said pair and said one of said nonmagnetic members of said pair becomes thinner as said film extends away from an end of said magnetic gap, in said surface of said head, along which said medium slides.

15. A head according to claim 13, wherein one of said magnetic blocks comprises a groove for accommodating a winding and wherein one of said magnetic films is deposited on the bottom of said groove as well.

16. A head according to claim 13, wherein one of said magnetic blocks comprises a groove for accommodating a winding and wherein the bottom of said groove is free of said magnetic film.

17. A head according to claim 13, wherein said first magnetic material comprises single crystal ferrite 18. A head according to claim 17, wherein said second magnetic material comprises a sendust alloy.

19. A magnetic head comprising:
a pair of magnetic blocks, each being made of a magnetic material;
a pair of magnetic films, one deposited on each of said magnetic blocks of said pair, each magnetic film being made of a second magnetic material having a high saturation magnetic flux density and a low magnetic permeability compared with said first magnetic material;
said pair of magnetic films including a magnetic gap arranged therebetween; and
a pair of nonmagnetic members, each one of said pair of nonmagnetic members cuts an end of said magnetic gap in a surface of said head, along which a medium slides;
each of said pair of magnetic blocks having a given width generally parallel to the magnetic gap;
at least one of said pair of magnetic films extending across only a portion of the width of a respective one of said pair of magnetic blocks;
wherein said at least one of said pair of magnetic films includes a first elongated portion extending between a respective one of said nonmagnetic members and the respective one of said pair of magnetic blocks and a second portion being disposed along said magnetic gap, said first elongated portion of said at least one of said pair of magnetic films extending, on the surface of the head, substantially parallel to a sliding direction of the medium.

20. A magnetic head comprising:
a pair of magnetic blocks, each being made of a first magnetic material;
a pair of magnetic films, one deposited on each of said magnetic blocks of said pair, each magnetic film being made of a second magnetic material having a high saturation magnetic flux density and a low magnetic permeability compared with said first magnetic material;
said pair of magnetic films including a magnetic gap arranged therebetween; and
a pair of nonmagnetic members, each one of said pair of nonmagnetic members abuts an end of said magnetic gap in a surface of said head, along which a medium slides;
each of said pair of magnetic blocks having a given width generally parallel to the magnetic gap;
at least one of said pair of magnetic films extending across only a portion of the width of a respective one of said pair of magnetic blocks;
wherein said at least one of said pair of magnetic films includes a first elongated portion extending between a respective one of said pair of nonmagnetic members and a respective one of said of magnetic blocks and a second portion being disposed along said magnetic gap, and wherein a boundary formed between said first elongated portion of said at least one of said pair of magnetic films and a corresponding one of said pair of nonmagnetic members, in the surface of the head, is substantially orthogonal to said magnetic gap adjacent one of said ends of said magnetic gap.

* * * * *

UNITED STATES PATENT AND TRADEMARK OFFICE
CERTIFICATE OF CORRECTION

PATENT NO. : 4,953,048               Page 1 of 3
DATED     : August 28, 1990
INVENTOR(S) : Makoto Kameyama et al.

It is certified that error appears in the above-identified patent and that said Letters Patent is hereby corrected as shown below:

ON THE COVER PAGE

FOREIGN APPLICATION PRIORITY DATA

"Japan ...... 59-272824" should read
--Japan ...... 60-272824--.

ABSTRACT

Line 1, "including" should read --including a--.

IN THE DISCLOSURE

COLUMN 6

Line 45, "placing" should read --placing,--; and
      Line 46, "other" should read --other,--.

COLUMN 7

Line 25, "Then" should read --Then,--.

COLUMN 9

Line 29, "portion)" should read --portion).--;
      Line 32, "boundary S2" should read --boundary $S_2$--; and
      Line 60, "in the groove" should read --in the block 51, and a film of sendust 52 is then formed on the groove--.

UNITED STATES PATENT AND TRADEMARK OFFICE
CERTIFICATE OF CORRECTION

PATENT NO. : 4,953,048

DATED : August 28, 1990

INVENTOR(S) : Makoto Kameyama et al.

It is certified that error appears in the above-identified patent and that said Letters Patent is hereby corrected as shown below:

COLUMN 10

Line 31, "formed obtained" should read --formed.
¶Figure 28C denotes an intermediate product obtained--;
Line 43, "reduced" should read --reduced.--; and
Line 57, "faces" should read --faces.--.

COLUMN 11

Line 8, "blocks" should read --blocks.--.

COLUMN 12

Line 63, "claim I," should read --claim 1,--.

COLUMN 13

Line 8, "50" should read --90--.

COLUMN 14

Line 4, "ferrite" should read --ferrite.--;
Line 19, "cuts" should read --abuts--; and

UNITED STATES PATENT AND TRADEMARK OFFICE
CERTIFICATE OF CORRECTION

PATENT NO. : 4,953,048

DATED : August 28, 1990

INVENTOR(S) : Makoto Kameyama et al

It is certified that error appears in the above-identified patent and that said Letters Patent is hereby corrected as shown below:

COLUMN 14

Line 59, "said" should read --said pair--.

Signed and Sealed this

Twenty-first Day of April, 1992

Attest:

HARRY F. MANBECK, JR.

*Attesting Officer*  *Commissioner of Patents and Trademarks*